United States Patent
Kurata

(10) Patent No.: US 10,015,347 B2
(45) Date of Patent: Jul. 3, 2018

(54) INFORMATION PROCESSING APPARATUS FOR ACQUIRING AND UPDATING A RETENTION STORAGE FOR INFORMATION STORED IN A PROCESSING APPARATUS, INFORMATION PROCESSING METHOD, AND NON-TRANSITORY STORAGE MEDIUM

(71) Applicant: CANON KABUSHIKI KAISHA, Tokyo (JP)

(72) Inventor: Yasuo Kurata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 15/158,445

(22) Filed: May 18, 2016

(65) Prior Publication Data

US 2016/0352951 A1    Dec. 1, 2016

(30) Foreign Application Priority Data

May 29, 2015    (JP) ................. 2015-110374

(51) Int. Cl.
    *H04N 1/00*      (2006.01)

(52) U.S. Cl.
    CPC ..... *H04N 1/00938* (2013.01); *H04N 1/00204* (2013.01)

(58) Field of Classification Search
    CPC .................. H04N 1/00204; H04N 1/00938
    See application file for complete search history.

(56) References Cited

U.S. PATENT DOCUMENTS

2007/0299989 A1* 12/2007 Maruyama ............ G06F 3/1204
                                                          710/5
2008/0225334 A1* 9/2008 Hamada ................ G06F 3/1205
                                                        358/1.15

FOREIGN PATENT DOCUMENTS

JP            4874859 B2     2/2012

* cited by examiner

*Primary Examiner* — Iriana Cruz
(74) *Attorney, Agent, or Firm* — Canon U.S.A., Inc. IP Division

(57) ABSTRACT

An information processing apparatus includes: a retention unit that retains a list of paper information and detailed information associated with the paper information; a first acquisition unit that acquires a list of paper information from a storage unit of a printer; an update unit that updates the list of the paper information retained in the retention unit by using the acquired list of paper information; a second acquisition unit that acquires, based on a difference between the list, of the paper information retained in the retention unit and the acquired list of paper information, part of detailed information associated with paper information stored in the storage unit, from the storage unit; and a generation unit that generates, based on the detailed information acquired by the second acquisition unit, data to be transmitted to the printer. The update unit updates, based on the acquired detailed information, the retained detailed information.

19 Claims, 9 Drawing Sheets

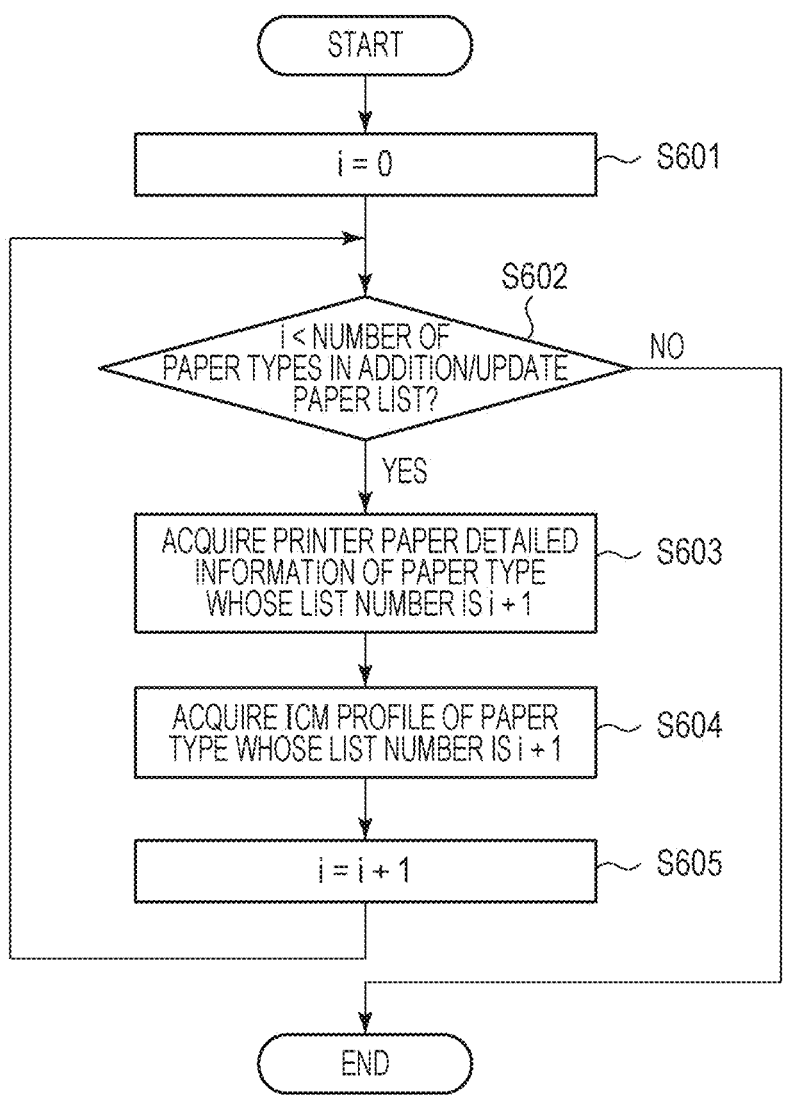

FIG. 7A

| | | | | 701 |
|---|---|---|---|---|
| UPDATE DATE AND TIME: 01/01/20xx/00:00:00 ||||
| LIST ORDER | PAPER TYPE | CHECKSUM VALUE | DISPLAY STATUS |
| 1 | PLAIN PAPER | 0x01AB | DISPLAY |
| 2 | COATED PAPER | 0xCB0B | DISPLAY |
| 3 | GLOSSY PAPER | 0xD125 | DISPLAY |
| 4 | POSTCARD | 0x5C2B | DISPLAY |
| 5 | MATTE PAPER | 0x1EC2 | DISPLAY |

| UPDATE DATE AND TIME: 02/03/20xx/00:00:00 ||||
|---|---|---|---|
| LIST ORDER | PAPER TYPE | CHECKSUM VALUE | DISPLAY STATUS |
| 1 | PLAIN PAPER | 0x01AB | DISPLAY |
| 2 | CANVAS | 0x23AC | DISPLAY |
| 3 | COATED PAPER | 0xCB0B | DISPLAY |
| 4 | GLOSSY PAPER | 0x2ACB | DISPLAY |
| 5 | POSTCARD | 0x5C2B | DISPLAY |
| 6 | MATTE PAPER | 0x1EC2 | DISPLAY |

FIG. 7C

| UPDATE DATE AND TIME: 04/05/20xx/00:00:00 ||||
|---|---|---|---|
| LIST ORDER | PAPER TYPE | CHECKSUM VALUE | DISPLAY STATUS |
| 1 | GLOSSY PAPER | 0xD125 | DISPLAY |
| 2 | PLAIN PAPER | 0x01AB | DISPLAY |
| 3 | COATED PAPER | 0xCB0B | HIDE |
| 4 | MATTE PAPER | 0x1EC2 | DISPLAY |

FIG. 8

| LIST NO. | PAPER TYPE |
|---|---|
| 1 | CANVAS |
| 2 | GLOSSY PAPER |

FIG. 9

| ITEM | ELEMENTS |
|---|---|
| PAPER TYPE | CANVAS |
| DOUBLE-SIDED | OFF |
| MONOCHROME PRINTING | OFF, ON |
| BORDERLESS | OFF |
| QUALITY | FAST, STANDARD, FINE |
| ICM | Canvas_Profile.icm |

INFORMATION PROCESSING APPARATUS FOR ACQUIRING AND UPDATING A RETENTION STORAGE FOR INFORMATION STORED IN A PROCESSING APPARATUS, INFORMATION PROCESSING METHOD, AND NON-TRANSITORY STORAGE MEDIUM

BACKGROUND OF THE INVENTION

Field of the Invention

The present invention relates to an information processing apparatus that connects to a processing apparatus and instructs the processing apparatus to execute a process, an information processing method, and a non-transitory storage medium.

Description of the Related Art

Existing printers typically each perform printing by using a printer driver installed into personal computers (PCs) connecting to the printers. The printer driver converts, on the basis of a print instruction from a user, a target document into print data that is interpretable by a printer, and transmits the print data to the printer. The printer rasterizes the received print data to print it.

Here, the printer driver retains device information of the connected printer therein, and provides print settings to the user on the basis of the device information. Furthermore, there is proposed an information processing apparatus that acquires device information from a printer and extends the functionality of a printer driver (Japanese Patent No. 4874859).

Incidentally, when a certain function of the printer is updated, a function of the printer driver connecting to the printer also has to be updated. In the information processing apparatus disclosed in Japanese Patent No. 4874859, however, the printer driver acquires device information from the printer in one go, and the device information is therefore large in volume, and thus takes time to acquire.

SUMMARY OF THE INVENTION

To solve the above-described issue, an information processing apparatus according to an aspect of the present invention includes: a retention unit configured to retain a list of paper information and detailed information associated with the paper information; a first acquisition unit configured to acquire a list of paper information from a storage unit of a printer; an update unit configured to update the list of the paper information retained in the retention unit by using the list of paper information acquired by the first acquisition unit; a second acquisition unit configured to acquire, based on a difference between the list of the paper information retained in the retention unit and the list of paper information acquired by the first acquisition unit, part of detailed information associated with paper information stored in the storage unit, from the storage unit; and a generation unit configured to generate, based on the detailed information acquired by the second acquisition unit, data to be transmitted to the printer. The update unit updates, based on the detailed information acquired by the second acquisition unit, the detailed information retained in the retention unit.

Further features of the present invention will become apparent from the following description of exemplary embodiments with reference to the attached drawings.

BRIEF DESCRIPTION OF THE DRAWINGS

FIG. 6 illustrates a process flow of the paper update program according to the first embodiment.

FIGS. 7A to 7C each illustrate components of paper list information according to the first embodiment.

FIG. 8 illustrates components of an addition/update paper list according to the first embodiment.

FIG. 9 illustrates components of paper detailed information according to the first embodiment.

DESCRIPTION OF THE EMBODIMENTS

Desirable embodiments of the present invention will be described in detail below with reference to the accompanying drawings. Note that the following embodiments are not intended to limit the present invention according to the claims, and that all of combinations of features described in the embodiments are not necessarily essential to the solution provided by the present invention.

First Embodiment

A printing system according to this embodiment will be described with reference to a block diagram illustrated in FIG. 1.

Figure 1:
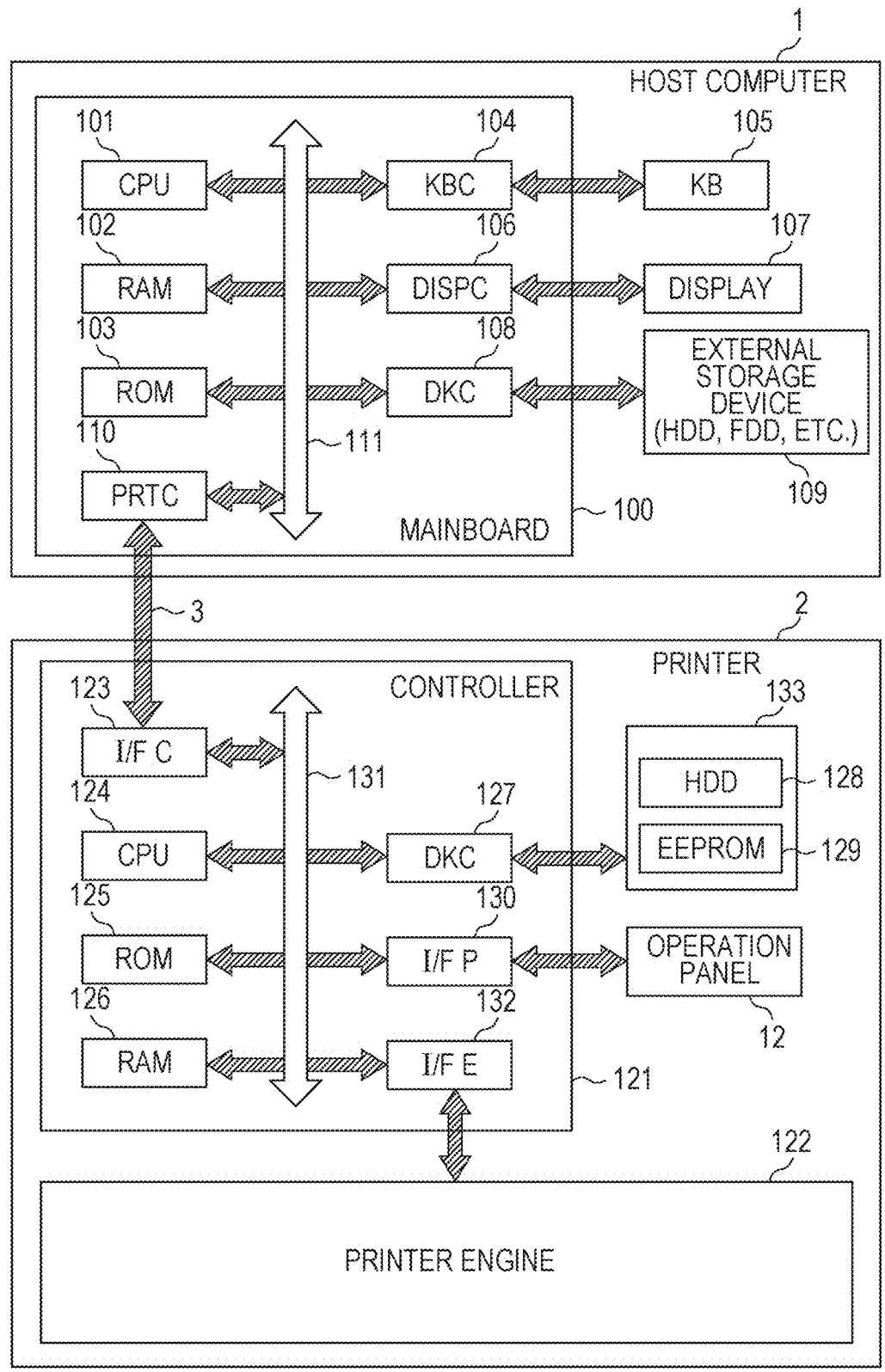
FIG. 1 is a block diagram illustrating a hardware configuration of a system according to a first embodiment.

FIG. 1 is a block diagram schematically illustrating the printing system according to the first embodiment. As illustrated in FIG. 1, the printing system includes a host computer 1 and a printer 2.

As illustrated in FIG. 1, the host computer 1 and the printer 2 are connected to each other via a certain bi-directional interface 3 (for example, a Universal Serial Bus (USB) or transmission control protocol/Internet protocol (TCP/IP) interface).

The host computer 1 is an information processing apparatus, and an example thereof is a personal computer (PC).

The host computer 1 includes a mainboard 100, a keyboard (KB) 105, a display (DISPLAY) 107, such as a liquid crystal display (LCD), and an external storage device 109.

The mainboard 100 includes a central processing unit (CPU) 101, a random access memory (RAM) 102, a read only memory (ROM) 103, a keyboard controller (KBC) 104, a display controller (DISPC) 106, a disk controller (DKC) 108, and a printer controller (PRTC) 110. In the mainboard 100, these are connected to one another via a system bus 111.

The CPU 101 controls the above-described constituent elements connected to the system bus 111 as a whole, and executes various programs stored on the ROM 103 or the like. The RAM 102 functions as a main memory or work area of the CPU 101. The ROM 103 stores an operating system, a program that executes each function provided in this embodiment, a boot program, various applications, a printer control command generation program (hereinafter referred to as a printer driver), and so forth.

The keyboard controller 104 controls inputs from the keyboard 105 or a pointing device, which is not illustrated. The keyboard controller 104 is also referred to as an operation unit or input unit.

The display controller 106 controls displays on the display 107, which is a display unit.

The disk controller 108 controls access of the mainboard 100 and the external storage device 109, such as a hard disk drive (HDD) or flexible disk drive (FDD), to each other.

The printer controller 110 is connected to the printer 2 via the bi-directional interface 3, and controls a communication process of data and commands with the printer 2.

The printer 2 includes a controller 121, a printer engine 122, an operation panel 12, and a non-volatile storage device 133, and is connected to the host computer 1 via the bi-directional interface 3.

The operation panel 12 includes an operation unit and a display unit, and an example thereof is a touch panel.

The non-volatile storage device 133 includes a hard disk drive (HDD) 128 and an electrically erasable programmable read only memory (EEPROM) 129. The non-volatile storage device 133 is also called non-volatile memory. In this embodiment, although the non-volatile storage device 133 is a device including the HDD 128 and the EEPROM 129, the non-volatile storage device 133 is not limited to this, and may be a device including either one, for example. The HDD 128 stores large volumes of data, such as data from a printer server 10 and ancillary information on the data. The EEPROM 129 stores printer's individual information or the like used in a printing operation. In this embodiment, as an example of printer's individual information, paper information will be described.

The controller 121 includes a CPU 124, a ROM 125, a RAM 126, an interface controller (I/F C) 123, a disk controller (DKC) 127, a panel interface (I/F P) 130, and an engine interface (I/F E) 132. In the controller 121, these are connected to one another via a system bus 131.

The CPU 124 controls the above-described constituent elements connected to the system bus 131 as a whole, and executes various programs stored on the ROM 125 or the like. The ROM 125 stores a program and various pieces of data. The program receives image data for printing and commands from the host computer 1, and controls the printer engine 122 to implement optimum recording. The RAM 126 is used as a work area that temporarily stores various pieces of data and various programs.

The interface controller 123 is connected to the host computer 1 via the bi-directional interface 3, and controls a communication process with the host computer 1.

The disk controller 127 controls access of the controller 121 and the non-volatile storage device 133 to each other. The panel interface 130 controls displays on the operation panel 12 or controls inputs from the operation panel 12. The engine interface 132 directly controls hardware to control the printer engine 122 that implements optimum recording.

The printer engine 122 prints an image on paper, which is a print medium, on the basis of image data by each printing method, such as an ink-jet method or electrophotographic method.

In this embodiment, the host computer 1 functions as a control device.

Figure 2:
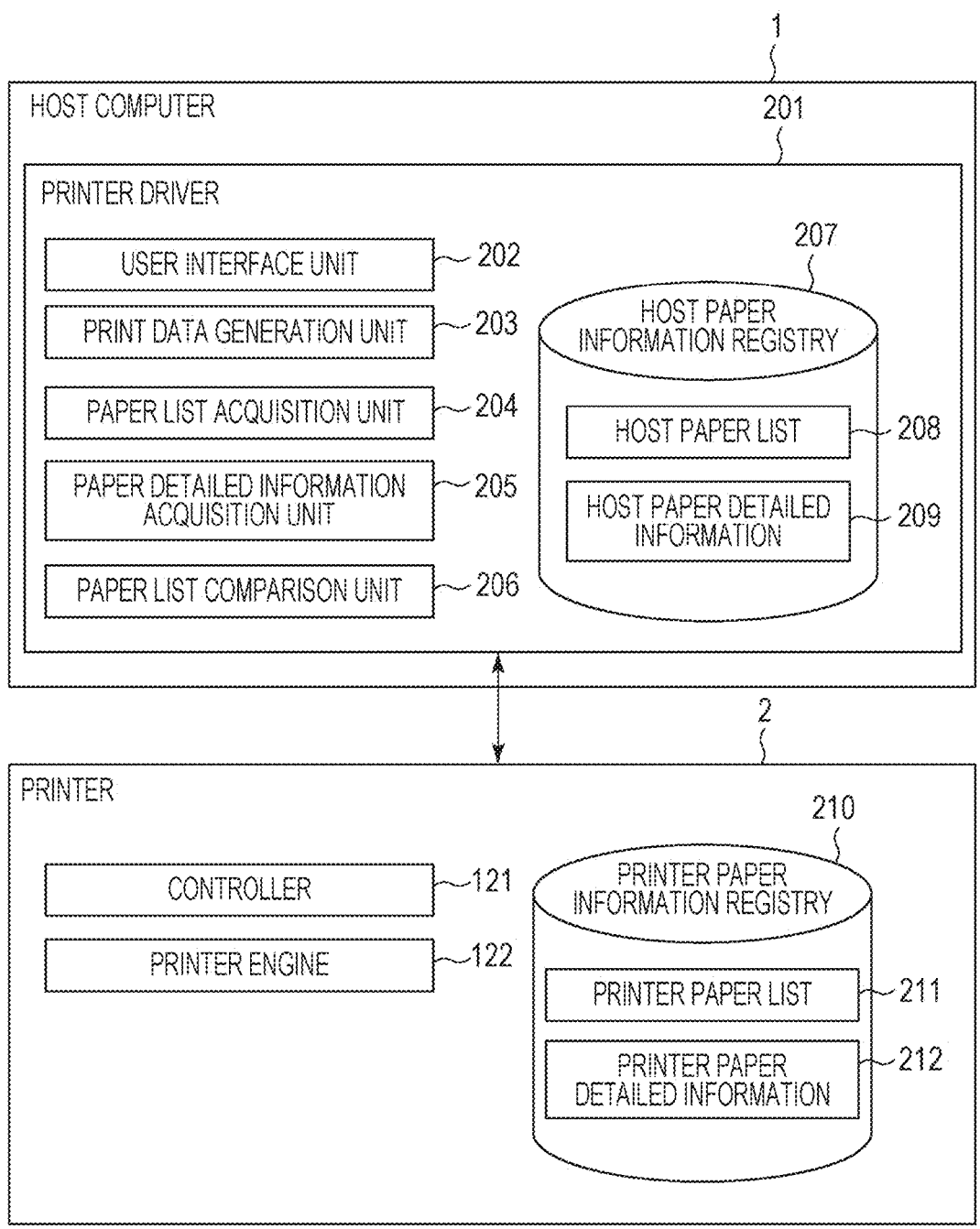
FIG. 2 is a block diagram illustrating a software configuration of the system according to the first embodiment.

FIG. 2 is a functional block diagram illustrating a software configuration of the printing system according to this embodiment.

The host computer 1 includes a printer driver 201. The printer driver 201 includes a plurality of function units and an information storage unit. Specifically, the printer driver 201 includes a user interface unit 202, a print data generation unit 203, a paper list acquisition unit 204, a paper detailed information acquisition unit 205, a paper list comparison unit 206, and a host paper information registry 207. The user interface unit 202 is a function unit that provides sections for inputting print settings of the printer driver 201 to a user. The printer driver 201 displays a print settings screen on the display 107 on the basis of a command to display the print settings screen from the operating system. At this time, the user interface unit 202 displays the print settings screen on the basis of information on functions of the printer 2 retained therein. The user interface unit 202 also displays the print settings screen on the basis of various pieces of information retained in the host paper information registry 207. Furthermore, the user interface unit 202 updates elements of a host paper list 208 and host paper detailed information 209 retained in the host paper information registry 207 by using printer paper information acquired from the printer 2.

The print data generation unit 203 generates print data to be transmitted to the printer 2 as a print job. The print data generation unit 203 converts, in accordance with print settings set using the user interface unit 202, a document provided by the user into a data format that is interpretable by the printer 2, and also generates a control command for performing printer control.

The paper list acquisition unit 204 is a function unit that acquires a printer paper list 211 retained in the printer 2 via the bi-directional interface 3.

The paper detailed information acquisition unit 205 is a function unit that acquires printer paper detailed information 212 retained in the printer 2 via the bi-directional interface 3.

The paper list comparison unit 206 is a function unit that compares the printer paper list 211 acquired by the paper list acquisition unit 204 with the host paper list 208, and that determines update elements of each paper type of the printer 2 in accordance with a paper update program to be described.

The host paper information registry 207 retains the host paper list 208 and the host paper detailed information 209. The host paper list 208 corresponds to the printer paper list 211 acquired from the printer 2, and the host paper detailed information 209 corresponds to the printer paper detailed information 212 acquired from the printer 2. The printer 2 includes the controller 121, the printer engine 122, and a printer paper information registry 210. The printer paper information registry 210 contains the printer paper list 211 and the printer paper detailed information 212. The printer paper list 211 and the host paper list 208 are each information of paper types, and each paper type is associated with functions provided by the printer 2. The printer paper detailed information 212 and the host paper detailed information 209 are each detailed information of functions associated with each paper type.

FIGS. 7A to 7C each illustrate an example of the host paper list 208 retained in the host paper information registry 207 or the printer paper list 211 retained in the printer paper information registry 210. As illustrated in FIGS. 7A to 7C, each paper list (the host paper list 208 or the printer paper list 211) contains an update date and time 701, list order 702, a paper type 703, a checksum value 704, and a display status 705. The update date and time 701 is a date and time on which the paper list was updated. The list order 702 is the order in which paper types are listed. The paper type 703 is the type of paper that can be used by the printer 2. The checksum value 704 is a value generated based on paper detailed information of the paper, and is used for identifying the uniqueness of elements of the paper detailed information of the paper. The display status 705 indicates a setting as to whether or not the paper is to be displayed on a print settings screen to be described. For example, in the case where the display status 705 indicates "display", the paper is displayed in a paper type setting section on the print settings screen, and, in the case of "hide", the paper is not displayed in the paper type setting section on the print settings screen.

FIG. 9 illustrates paper detailed information of "canvas" as an example of the host paper detailed information 209 or the printer paper detailed information 212 for a certain paper type. The paper detailed information (the host paper detailed information 209 or the printer paper detailed information 212) contains one information table per paper type, and thus contains the same number of information tables as the number of the paper types 703. The paper detailed information illustrated in FIG. 9 contains an item 901 and elements 902, and corresponds to functions provided in a basic setup sheet 301 on the print settings screen. Thus, for each paper type, selectable settings are predetermined for double-sided printing setting, monochrome printing setting, borderless printing setting, quality setting, and Image Color Management (ICM) setting. The elements 902 of "ICM" of the item 901 is a profile name applied when a setting of an ICM mode is set.

In this embodiment, paper information of the printer 2 is kept in the printer paper information registry 210, and the printer driver 201 acquires the paper information of the printer 2 from the printer paper information registry 210, and retains it in the host paper information registry 207. Hence, in this embodiment, the host paper list 208 and the printer paper list 211 have the same data structure, and the host paper detailed information 209 and the printer paper detailed information 212 have the same data structure.

Here, paper detailed information (the host paper detailed information 209 or the printer paper detailed information 212) is very large in data volume in comparison with a paper list (the host paper list 208 or the printer paper list 211). In this embodiment, a method to be described enables a reduction in the data volume of the paper detailed information acquired by the printer driver 201 from the printer paper information registry 210 of the printer 2.

The printer paper list 211 and the printer paper detailed information 212 retained in the printer paper information registry 210 of the printer 2 are updated. Examples of update elements include addition or deletion of a usable paper type, updating of print parameters set for each paper type, and updating of the list order in which paper types are listed. Updating of the printer paper information registry 210 can be performed by, for example, an application or the like that runs on an external device. Note that updating is not limited to this, and updating may be performed, for example, on the basis of an instruction provided from the user through the operation panel 12 or the like of the printer 2, or on the basis of information received by the printer 2 through the Internet or the like.

Figure 3:
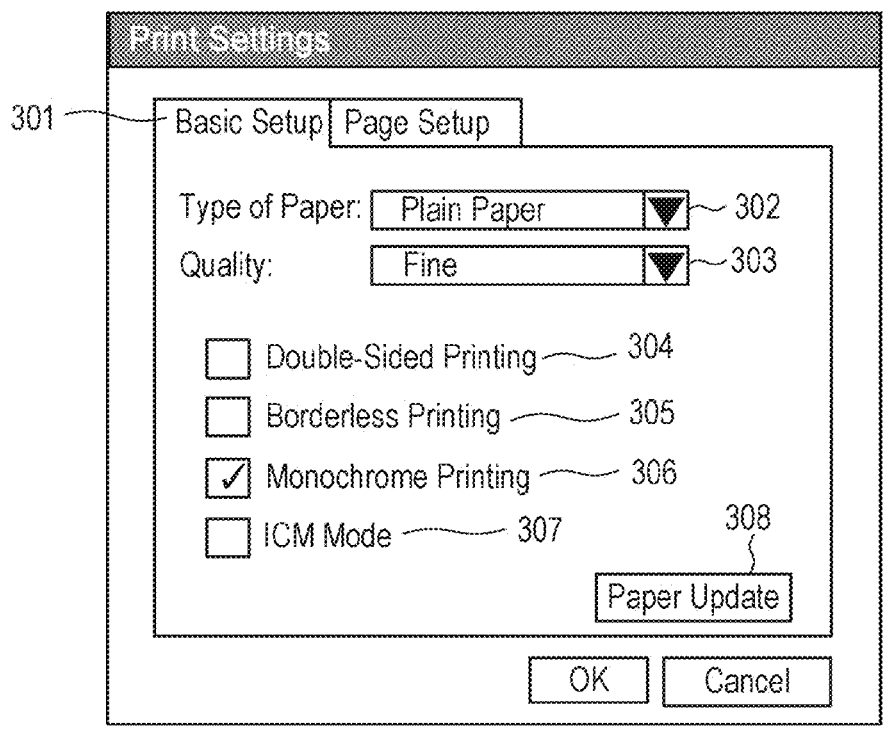
FIG. 3 illustrates a print settings screen provided by a printer driver according to the first embodiment.

FIG. 3 illustrates an example of a print settings screen of the printer driver 201 provided by the user interface unit 202. When the printer driver 201 receives a command to display the print settings screen from the operating system, the printer driver 201 displays the print settings screen illustrated in FIG. 3 on the display 107. On the print settings screen, settings of printing operations of the printer 2 can be set. The print settings screen illustrated in FIG. 3 contains the basic setup sheet 301 and a page setup sheet. The basic setup sheet 301 is provided in accordance with information of the host paper information registry 207, and enables setting of the type of paper and setting of functions associated with the paper type. Setting sections for the functions associated with the paper type are a quality setting section 303, a double-sided printing setting section 304, a borderless printing setting section 305, a monochrome printing setting section 306, and an ICM mode setting section 307.

In a paper type setting section 302, a paper type can be selected and set.

In the quality setting section 303, the output quality of a printed material can be selected from among options and set. Examples of an option include "Fine", "Standard", and "Fast".

The double-sided printing setting section 304, the borderless printing setting section 305, and the monochrome printing setting section 306 each contain a checkbox, where "ON" or "OFF" for each function can be selected. These settings are reflected in an output result output by the printer 2.

The ICM mode setting section 307 is a setting section for a color correction function using a color management function provided by the operating system although detailed description thereof is omitted. The ICM mode setting section 307 contains a checkbox, where "ON" or "OFF" can be selected. In the ICM mode setting section 307, when "ON" is selected and printing is performed, color correction is performed using a profile optimized for each paper type.

A paper update button 308 is a button for running a paper update program to be described.

When an OK button illustrated in FIG. 3 is selected, print settings selected (set) on the print settings screen are reflected, and then the print setting can be finished. When a cancel button illustrated in FIG. 3 is selected, the print settings screen is closed, and then the print setting is finished.

In the paper type setting section 302 provided by the user interface unit 202, the paper types 703 listed in the host paper list 208 are displayed according to the list order 702. In the case of a paper type whose display status 705 indicates "display", the paper type is provided as an option to the paper type setting section 302. In the case of a paper type whose display status 705 indicates "hide", the paper type is not provided to the paper type setting section 302.

In the case where one paper type is selected in the paper type setting section 302 in the basic setup sheet 301, the user interface unit 202 provides options for the other setting sections in accordance with the host paper detailed information 209 (the elements 902 corresponding to the items 901 in FIG. 9). That is, the user interface unit 202 provides the quality setting section 303, the double-sided printing setting section 304, the borderless printing setting section 305, the monochrome printing setting section 306, and the ICM mode setting section 307 in accordance with the host paper detailed information 209 of the paper type set in the paper type setting section 302. In the host paper detailed information illustrated in FIG. 9, for example, the setting of double-sided printing is OFF, and thus the double-sided printing setting section 304 is grayed out, that is, is displayed so that double-sided printing cannot be selected.

Figure 4:
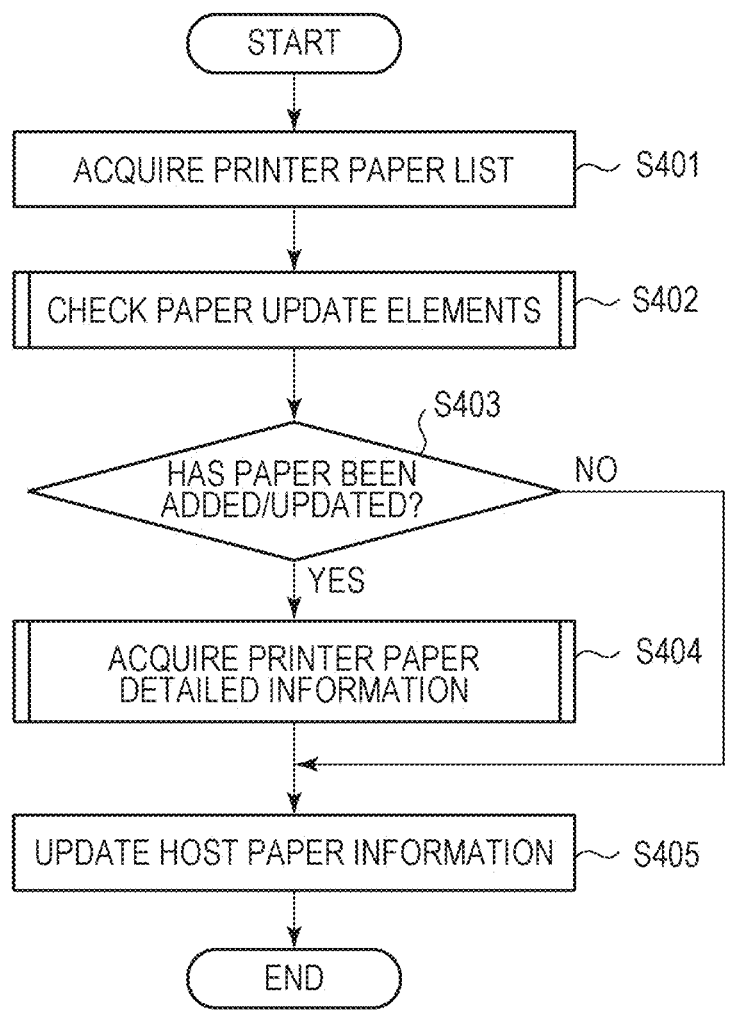
FIG. 4 illustrates a process flow of a paper update program according to the first embodiment.

FIG. 4 illustrates a process flow of a paper update program executed by the printer driver 201. A process starts when the paper update button 308 is pressed down (selected). The flowchart illustrated in FIG. 4 is implemented by causing the CPU 101 to load the paper update program stored on the ROM 103 onto the RAM 102 and to execute it.

First, the paper list acquisition unit 204 acquires the printer paper list 211 from the printer 2 in S401.

Then, in S402, the paper list comparison unit 2 compares the host paper list 208 with the printer paper list 211 acquired in S401, and checks paper update elements of the printer 2. In this check process, an addition/update paper list illustrated in FIG. 8 is updated.

Figure 5:
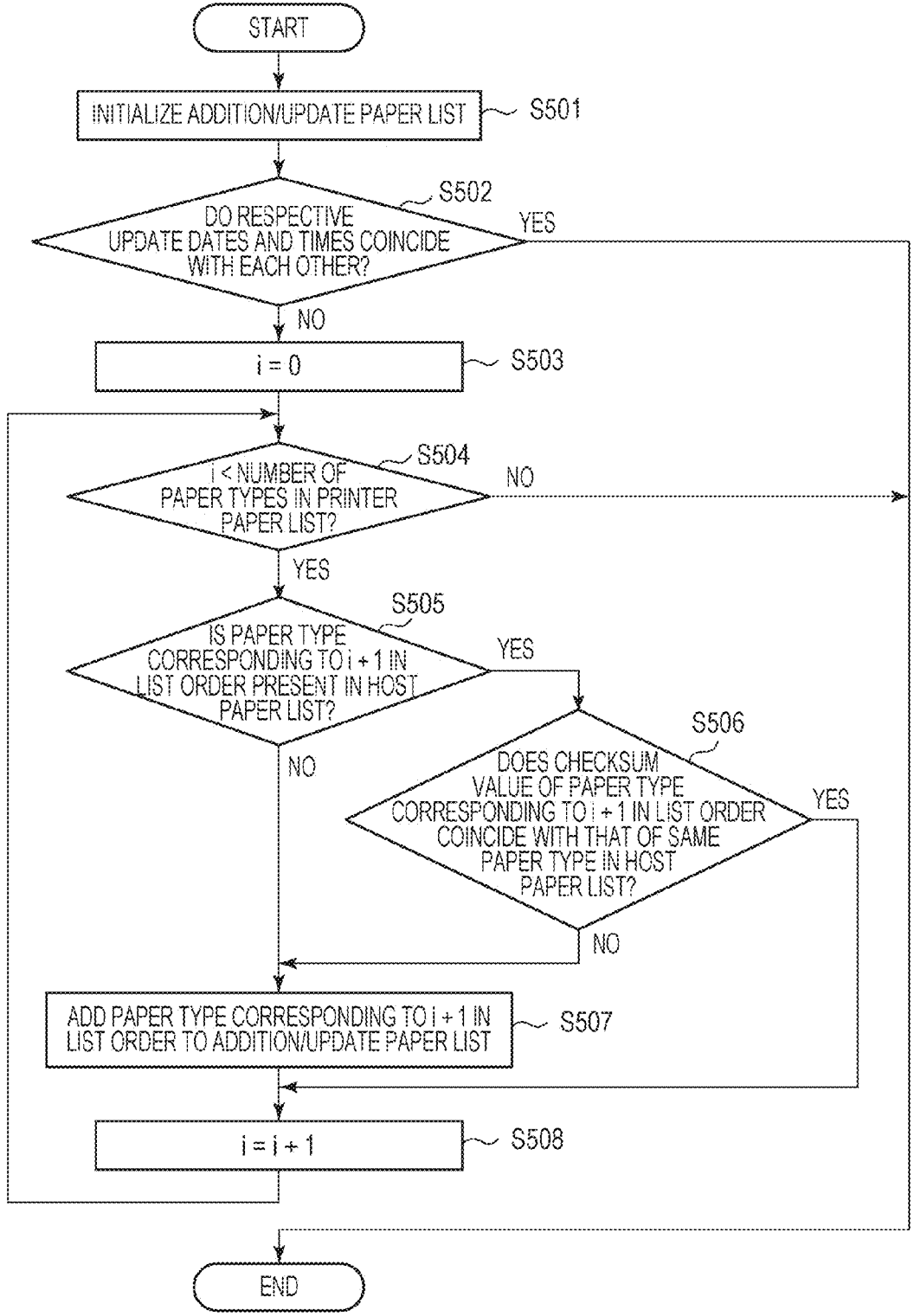
FIG. 5 illustrates a process flow of the paper update program according to the first embodiment.

Here, the check process of checking paper update elements in S402 will be described with reference to FIG. 5. FIG. 5 illustrates a process flow in which paper update elements are checked in S402. There will be described below an example of the case where the host paper list 208 is in a state of FIG. 7A, and where the printer paper list 211 is a paper list of FIG. 7B or 7C.

In S501, an addition/update paper list is initialized. As illustrated in FIG. 8, the addition/update paper list is list information containing a list number 801 and a paper type 802. In S501, this list is initialized to be empty.

In S502, the host paper list 208 is compared with the printer paper list 211 in terms of the update date and time 701, and it is determined whether the respective update dates and times coincide with each other. If the respective update dates and times coincide with each other (Yes in S502), the process flow illustrated in FIG. 5 ends directly. If the respective update dates and times do not coincide with each other (No in S502), the process proceeds to S503. For example, in the case where the host paper list 208 is a paper list of FIG. 7A and where the printer paper list 211 is the paper list of FIG. 7B or 7C, the respective update dates and times do not coincide with each other, and thus the process proceeds to S503.

In S503, for initialization, "0" is assigned to a variable i for a subsequent loop process.

In S504, the variable i is compared with the number of paper types in the printer paper list 211. If the variable i is smaller than the number of paper types (Yes in S504), the process proceeds to S505. If the variable i is not smaller than the number of paper types (No in S504), the process flow illustrated in FIG. 5 ends. In the case of the paper list of FIG. 7B, the number of paper types is "6", and, in the case of the paper list of FIG. 7C, the number of paper types is "4".

In S505, it is determined whether a paper type corresponding to "i+1" in the list order 702 in the printer paper list 211 is present in the host paper list 208. If a paper type corresponding to "i+1" is present in the host paper list 208 (Yes in S505), the process proceeds to S506. If a paper type corresponding to "i+1" is not present in the host paper list 208 (No in S505), the process proceeds to S507. For example, in the case where the printer paper list 211 is the paper list of FIG. 7B and where the host paper list 208 is the paper list of FIG. 7A, it is determined that "canvas" corresponding to "2" in the list order 702 in the printer paper list 211 is not present in the host paper list 208 of FIG. 7A.

In S506, it is determined whether the checksum value 704 of the paper type corresponding to "i+1" in the list order 702 in the printer paper list 211 coincides with that of the same paper type in the host paper list 208. If the checksum value 704 of the paper type corresponding to "i+1" coincides with that of the same paper type in the host paper list 208 (Yes in S506), the process proceeds to S508. If the checksum value 704 of the paper type corresponding to "i+1" does not coincide with that of the same paper type in the host paper list 208 (No in S506), the process proceed to S507. In the case where the printer paper list 211 is the paper list of FIG. 7B, in the determination of the checksum value 704 corresponding to "4" in the list order 702, the checksum value 704 is "0x2ACB". On the other hand, the checksum value 704 of "glossy paper" in the host paper list 208 of FIG. 7A is "0xD125", and thus these checksum values do not coincide with each other. In this case, the process proceeds to S507.

In S507, the paper type corresponding to "i+1" in the list order 702 is added to the addition/update paper list. In the case where the host paper list 208 is the paper list of FIG. 7A and where the printer paper list 211 is the paper list of FIG. 7B, when the paper type is "canvas" or "glossy paper", the process proceeds to S507, and "canvas" and "glossy paper" are listed in the addition/update paper list as illustrated in FIG. 8. On the other hand, in the case where the host paper list 208 is the paper list of FIG. 7A and where the printer paper list 211 is the paper list of FIG. 7C, there is no paper types that result in proceeding to S507 in the determinations in S505 and S506, and thus the addition/update paper list remains empty.

Subsequently, in S508, the variable i for the loop process is incremented, and the process returns to S504.

When the above-described process in FIG. 5 is performed, a difference between the printer paper list 211 and the host paper list 208 can be identified. That is, a paper type whose printer paper detailed information 212 of the printer 2 is to be acquired by the printer driver 201 can be listed in the addition/update paper list.

Description will now return to the process flow illustrated in FIG. 4. Then, in S403, the user interface unit 202 determines, on the basis of the addition/update paper list, whether paper has been added/updated. If paper has been added/updated (Yes in S403), the process proceeds to S404. If no paper has been added/updated (No in S403), the process proceeds to S405. Here, if the addition/update paper list is empty, the process proceeds to S405. If at least one paper type is listed in the addition/update paper list, the process proceeds to S404.

In S404, the paper detailed information acquisition unit 205 acquires the printer paper detailed information 212.

Here, a process of acquiring the printer paper detailed information 212 will be described with reference to FIG. 6. FIG. 6 illustrates a process flow in which the printer paper detailed information 212 is acquired in S404.

In S601, for initialization, "0" is assigned to a variable i for a subsequent loop process.

In S602, it is determined whether the variable i is smaller than the number of paper types in the addition/update paper list. If the variable i is smaller than the number of paper types (Yes in S602), the process proceeds to S603. If the variable i is not smaller than the number of paper types (No in S602), the process flow illustrated in FIG. 6 ends. In the case of the addition/update paper list illustrated in FIG. 8, the number of paper types is "2".

In S603, the paper detailed information acquisition unit 205 acquires the printer paper detailed information 212 of a paper type whose list number 801 in the addition/update paper list is "i+1". In the case of the addition/update paper list illustrated in FIG. 8, the paper detailed information acquisition unit 205 issues acquisition requests for pieces of printer paper detailed information 212 of "canvas" and "glossy paper" to the printer 2, and acquires the pieces of printer paper detailed information 212 from the printer 2 as responses to the acquisition requests.

In S604, a profile recorded in the printer paper detailed information 212 acquired in S603 is acquired. In the case of the printer paper detailed information illustrated in FIG. 9, the paper detailed information acquisition unit 205 issues an acquisition request for "Canvas_Profile.icm" to the printer 2, and acquires a corresponding ICM profile as a response to the acquisition request. Here, the ICM profile is stored in a specific area provided by the operating system. On this occasion, when the ICM profile is acquired from the printer 2 in S604, it may be determined whether the ICM profile is already present in the host computer 1, and the ICM profile may be acquired from the printer 2 only if it is not present.

In S605, the variable i for the loop process is incremented, and the process returns to S602.

As described above, when the process in FIG. 6 is performed, the printer driver 201 can acquire only the printer paper detailed information 212 of paper which has been added/updated in the printer 2 and an ICM profile associated with the paper from the printer 2. That is, the printer driver 201 can acquire only paper detailed information which is not retained in the host paper information registry 207 among pieces of printer paper detailed information 212 retained in the printer paper information registry 210 of the printer 2. Description will now return to the process flow illustrated in FIG. 4. In S405, the user interface unit 202 updates paper information of the host paper information registry 207 by using the paper information of the printer paper information registry 210 acquired from the printer 2 in S401 and S404, and the process ends.

In the case where the host paper list 208 is the paper list of FIG. 7A and where the printer paper list 211 acquired in S401 is the paper list of FIG. 7C, only the host paper list 208 is updated and the updating is performed by overwriting the host paper list 208 with the printer paper list 211. That is, in the host paper information registry 207, the host paper list 208 is updated, but the host paper detailed information 209 is not updated. As a result, "postcard" is deleted from the paper list, the display status of "coated paper" is changed, and the list order is changed. As for a paper type deleted due to updating of the host paper list 208, the host paper detailed information 209 corresponding to the deleted paper type among pieces of host paper detailed information 209 may be deleted from the host paper information registry 207.

In the case where the host paper list 208 is the paper list of FIG. 7A and where the printer paper list 211 acquired in S401 is the paper list of FIG. 7B, the information of the host paper list 208 is updated by overwriting the host paper list 208 with the printer paper list 211. As a result, "canvas" is added to the paper list, the checksum value of "glossy paper" is updated, and the list order is changed. Additionally, a process is performed in which the pieces of printer paper detailed information 212 of "canvas" and "glossy paper" acquired in S404 are added to the host paper detailed information 209. Furthermore, ICM profiles of "canvas" and "glossy paper" acquired in S404 are stored in the specific area provided by the operating system.

In this embodiment, first, the printer driver 201 acquires the printer paper list 211 to check whether paper types of the printer 2 have been updated, and update elements. Then, the printer driver 201 acquires only the printer paper detailed information 212 of a paper type which is not retained in the printer driver 201 from the printer 2. Thus, the printer driver 201 can acquire part of the paper information of the printer paper information registry 210 without acquiring all the paper information of the printer paper information registry 210.

As described above, the printer driver 201 acquires only a difference between the host paper information and the printer paper information. This, in updating functions associated with paper types, can reduce the volume of data acquired (specifically, the data volume of detailed information), and a time period during which acquisition is performed, thus enhancing usability.

Second Embodiment

In this embodiment, a process flow performed when the printer driver 201 is installed into the host computer 1 will be described. Note that descriptions that overlap those in the first embodiment are omitted. Furthermore, components that are the same as those in the first embodiment are denoted by the same reference numerals.

Figure 10:
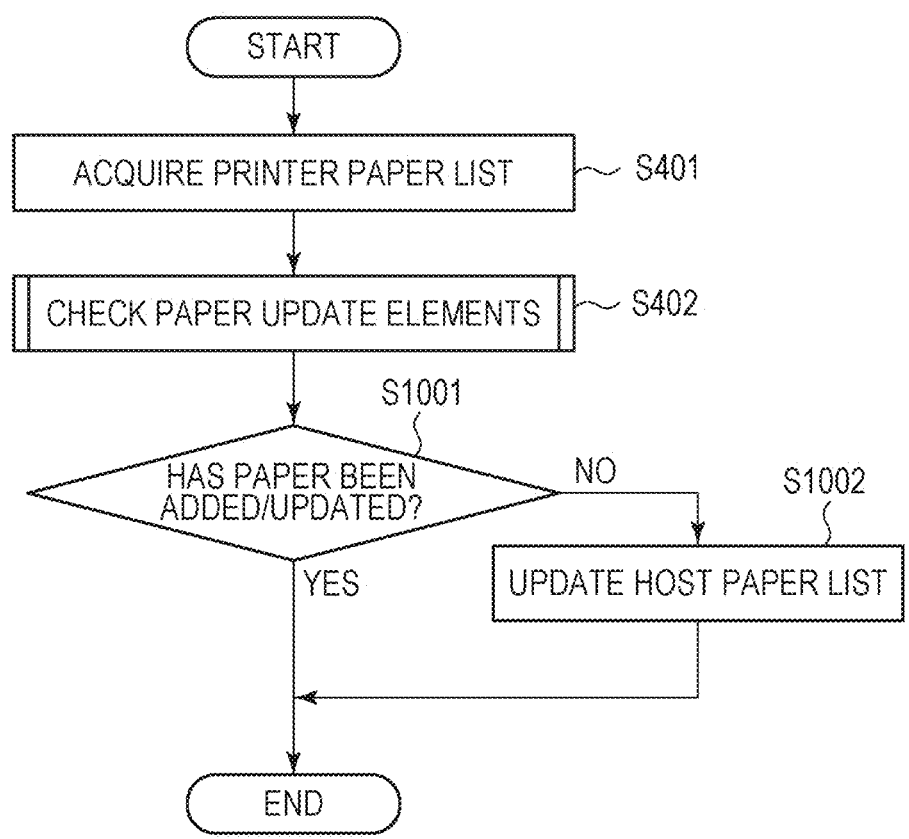
FIG. 10 illustrates a process flow according to a second embodiment performed when the printer driver is installed.

FIG. 10 illustrates a process flow performed when the printer driver 201 is installed into the host computer 1. With this, the host computer 1 is initialized for data transmission to the printer 2. The process flow illustrated in FIG. 10 starts when the operating system issues a notification to the printer driver 201 at the time of installation.

Processes in S401 and S402 are the same as those illustrated in FIG. 4, and thus descriptions thereof are omitted.

In S1001, the user interface unit 202 determines, on the basis of the addition/update paper list generated in S402, whether paper has been added/updated. If the addition/update paper list is empty, it is determined that no paper has been added/updated (No in S1001), and the process proceeds to S1002. If at least one paper type is listed in the addition/update paper list, it is determined that paper has been added/updated (Yes in S1001), and the process ends. In S1002, the user interface unit 202 overwrites and updates the host paper list 208 with the printer paper list 211 acquired in S401, and the process ends. In the case where the host paper list 208 is the paper list of FIG. 7A and where the printer paper list 211 is the paper list of FIG. 7C, the host paper list 208 is updated. As a result, "postcard" is deleted from the paper list, the display status of "coated paper" is changed, and the list order is changed. On the other hand, in the case where the printer paper list 211 is the paper list of FIG. 7B, the process in S1002 is not performed, and the process ends.

In this embodiment, at the time of installation, host paper information is updated only if no paper has been added/updated. This can reduce the volume of paper information acquired from the printer 2 at the time of installation, and avoid a significant increase in a time period taken to perform installation. In other words, this, in installing the printer driver 201, can reduce the data volume (data size) of detailed information acquired by the printer driver 201, and a time period during which acquisition is performed, thus enhancing usability. In this embodiment, although media information is not acquired at the time of installation, when the paper update button 308 is selected on the print settings screen provided by the printer driver 201, not only media information but also added media may be acquired.

Furthermore, the following unit may be provided. As a result of checking paper update elements of the printer 2 at the time of installation of the printer driver 201, if it is determined that paper has been added/updated, the unit may notify the user of the result in some way. This can lead the user to the paper update button 308 on the print settings screen, and enables the user to update paper types with ease in accordance with the paper update program illustrated in FIG. 4.

In acquiring detailed information of functions of an external device, this embodiment can reduce a time period during which acquisition is performed.

The present invention is not limited to the above-described embodiments. In the above-described embodiments, although the case where detailed information of functions associated with paper information is acquired is described as an example, the present invention is not limited to this. For example, in acquiring detailed information of functions, in the case where a list of certain information and detailed information of functions associated with the certain information are contained, a difference between pieces of detailed information of functions retained in respective devices may be identified on the basis of the respective lists of certain information. Then, detailed information of functions may be acquired on the basis of the identified difference.

In the above-described embodiments, although paper information (the printer paper list 211 and the printer paper detailed information 212) is acquired from the printer paper information registry 210 of the printer 2, the present invention is not limited to this. Paper information may be acquired from a storage unit provided outside the printer 2 and the host computer 1. In this case, when the paper information stored in the storage unit is updated, the embodiments can be applied.

Furthermore, in the above-described embodiments, although the printer is described as an example of an external device of the information processing apparatus, the present invention is not limited to this, and the external device may be a scanner or an electrophotographic device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110374, filed May 29, 2015, which is hereby incorporated by reference herein in its entirety.

What is claimed is:

1. An information processing apparatus comprising:
one or more processors; and
one or more memories storing instructions that, when executed by the one or more processors, cause the information processing apparatus to execute steps comprising:
acquiring, from a retention storage of the information processing apparatus, a first list of paper types;
acquiring, from a printer to which the information processing apparatus is communicably connected, a second list of paper types stored in a storage of the printer;
determining whether there is a difference between the first list of the paper types and the second list of paper types;
updating the first list of the paper types retained in the retention storage by using the second list of paper types based on the determination;
acquiring, from the printer after the determination, a portion of second detailed information based on the difference between the first list of the paper types and the second list of paper types, wherein the second detailed information indicates print functions associated with the paper types included in the second list of the paper types and is stored in the storage of the printer;
updating first detailed information which indicates print functions associated with paper types stored in the retention storage, based on the portion of the second detailed information; and
generating print data, based on the updated first detailed information stored in the retention storage.

2. The information processing apparatus according to claim 1, wherein detailed information corresponding to paper information which is not retained in the retention storage is acquired as the portion of second detailed information, among pieces of paper information contained in the second list of paper types.

3. The information processing apparatus according to claim 1, wherein, if there is no difference between the first list of the paper types stored in the retention storage and the second list of paper types, detailed information stored in the printer storage is not acquired.

4. The information processing apparatus according to claim 1, wherein the retention storage stores the portion of the second detailed information.

5. The information processing apparatus according to claim 1, wherein the first list of the paper types stored in the retention storage is updated by overwriting the list of the first paper types stored in the retention storage, using the second list of paper types acquired from the printer storage.

6. The information processing apparatus according to claim 1, wherein the information processing apparatus further executes a step of setting a setting of an operation of the printer based on the first detailed information stored in the retention storage,
wherein the print data is generated based on the setting performed in the setting.

7. The information processing apparatus according to claim 1, wherein, if initialization for data transmission to the printer is performed, the second detailed information stored in the printer storage is not acquired.

8. The information processing apparatus according to claim 7, wherein the initialization for data transmission to the printer comprises installation of a driver for the printer into the information processing apparatus.

9. The information processing apparatus according to claim 1, wherein, when initialization for data transmission to the printer is performed, if there is a difference between the second list of paper types stored in the printer storage and the first list of paper types stored in the retention storage and if no paper information is added to the retention storage, based on the second list of paper types stored in the printer storage, the first paper types stored in the retention storage is updated.

10. An information processing method for controlling an information processing apparatus, the method comprising:
acquiring, from a retention storage of the information processing apparatus, a first list of paper types;
acquiring, from a printer to which the information processing apparatus is communicably connected, a second list of paper types stored in a storage of the printer;

determining whether there is a difference between the first list of the paper types and the second list of paper types;

updating the first list of the paper types retained in the retention storage by using the acquired second list of paper types based on the determination;

acquiring, from the printer after the determination, a portion of second detailed information based on the difference between the first list of the paper types and the second list of paper types, wherein the second detailed information indicates print functions associated with the paper types included in the second list of the paper types and is stored in the storage of the printer;

updating first detailed information which indicates print functions associated with paper types stored in the retention storage, based on the portion of the second detailed information; and generating print data, based on the updated first detailed information stored in the retention storage.

11. A non-transitory computer-readable storage medium storing a program that, when executed, causes a computer to execute a process, the process comprising:

acquiring, from a retention storage configured to retain a first list of paper types, the first list of the paper types;

acquiring, from a printer to which the information processing apparatus is communicably connected, a second list of paper types stored in a storage of the printer;

determining whether there is a difference between the first list of the paper types and the second list of paper types;

updating the first list of the paper types retained in the retention storage by using the acquired second list of paper types based on the determination;

acquiring, from the printer after the determination, based on the difference between the first list of the paper types and the second list of paper types, wherein the second detailed information indicates print functions associated with the paper types included in the second list of the paper types and is stored in the storage of the printer;

updating, based on the portion of the second detailed information, the first detailed information which indicates print functions associated with paper types stored in the retention storage; and generating, based on the updated first detailed information stored in the retention storage, print data to be transmitted to the printer.

12. The information processing method according to claim 10, wherein detailed information corresponding to paper information which is not retained in the retention storage is acquired as the portion of second detailed information, among pieces of paper information contained in the second list of paper information.

13. The information processing method according to claim 10, wherein, if there is no difference between the first list of the paper information stored in the retention storage and the second list of paper information, detailed information stored in the printer storage is not acquired.

14. The information processing method according to claim 10, wherein the retention storage stores the portion of the second detailed information.

15. The information processing method according to claim 10, wherein the first list of the paper information stored in the retention storage is updated by overwriting the list of the first paper information stored in the retention storage, using the second list of paper information acquired from the printer storage.

16. The information processing method according to claim 10, further comprising setting a setting of an operation of the printer based on the first detailed information stored in the retention storage, wherein the print data is generated based on the setting performed in the setting.

17. The information processing method according to claim 10, wherein, if initialization for data transmission to the printer is performed, the second detailed information stored in the printer storage is not acquired.

18. The information processing method according to claim 17, wherein the initialization for data transmission to the printer comprises installation of a driver for the printer into the information processing apparatus.

19. The information processing method according to claim 10, wherein, when initialization for data transmission to the printer is performed, if there is a difference between the second list of paper information stored in the printer storage and the first list of paper information stored in the retention storage and if no paper information is added to the retention storage, based on the second list of paper information stored in the printer storage, the first paper information stored in the retention storage is updated.

* * * * *